R. LEWIS.

Cotton-Presses.

No. 136,841.

Patented March 18, 1873.

Witnesses.
C. Voigt
W. Jacobs

Inventor.
Richard Lewis.

UNITED STATES PATENT OFFICE.

RICHARD LEWIS, OF CHARLESTON, SOUTH CAROLINA.

IMPROVEMENT IN COTTON-PRESSES.

Specification forming part of Letters Patent No. 136,841, dated March 18, 1873.

*To all whom it may concern:*

Be it known that I, RICHARD LEWIS, of Charleston, county of Charleston, in the State of South Carolina, have invented or discovered a new and Improved Mode of Compressing Cotton-Bales; and I do hereby declare that the following is a full, clear, and exact description thereof, reference being had to the annexed drawing making a part of this specification.

The improvement consists in compressing cotton-bales on trucks provided with bars or openings for the passage of the bands, which may be on the bottom of the truck or in the bottom adjustable board, or both, dispensing with the bars now on the press, leaving the platens a perfect plane, and so adjusting and securing the bales to the trucks that the taking in of the slack of the bands and locking or tying them is all that is required at the press.

Figure 1:
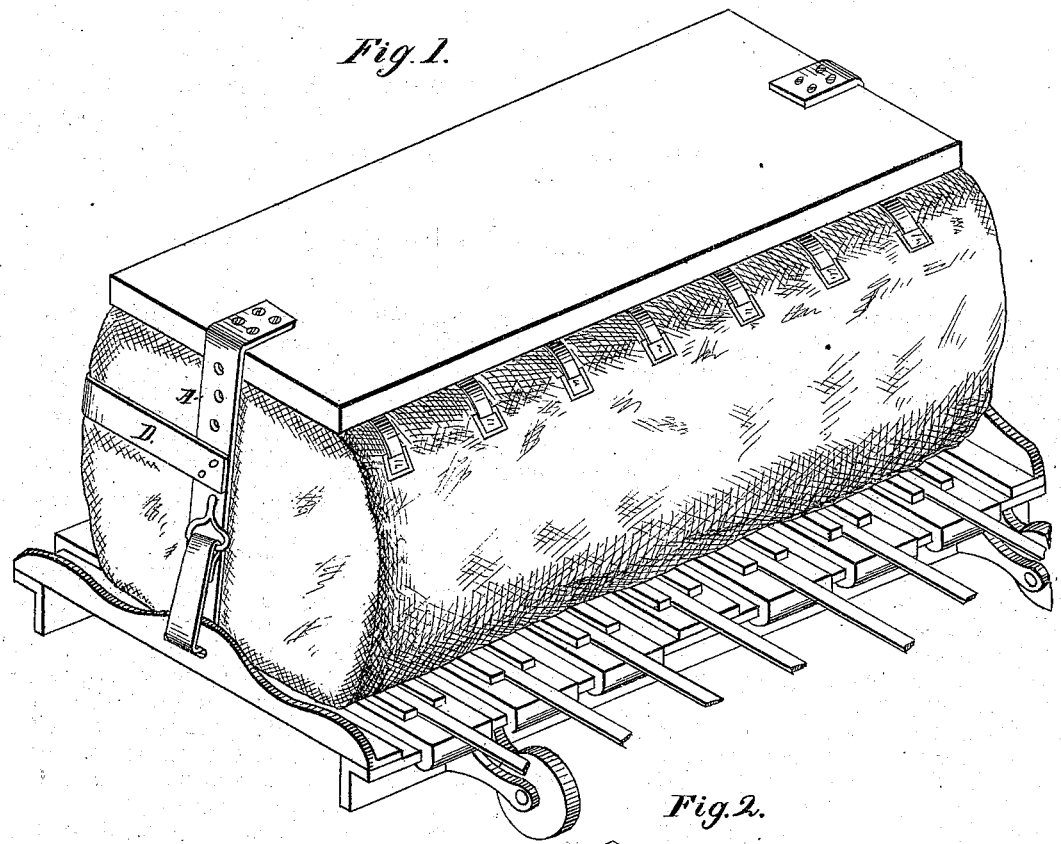
Figure 2:
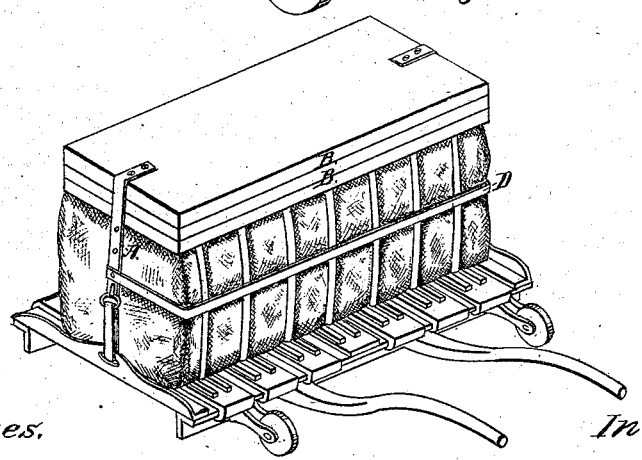

Figure 1 is a perspective view of the front of a truck and bale prepared for the press. Fig. 2 is a perspective view of the back of the same.

The trucks should be constructed of iron; and, with a view to lightness, I should prefer a truck with from six to eight bars, with grooves in them for the passage of the bands, the bars being adjustable to accommodate various-sized bales. The bars would be light, as the grooves in them would require only sufficient depth to allow of the bands drawing through them, the bands being placed in the groove previous to placing the bale on the truck. They can be constructed by any practical worker in iron.

The mode of operating the trucks is, (a sufficient number being provided to keep the press employed, with a surplus for breakage:) The bands being laid in the grooves, the bales placed on the truck, the tie-end of the bands are bent over to the front of the bale, when adjustable board or boards B are placed on them, securing them in place and the bale to the truck by straps A, or any other suitable device. Strap D is for the purpose of keeping the bands close to the back of the bale, and should be adjustable. The bale being in readiness is brought to the back of the press; the two front wheels of the truck are passed over the platen, so that nothing but the bars rest on it, when the platen rises, compressing the bale in the truck. At the same time the three operators in front of the press take the free end of a band in each hand, and as the press rises, drawing in the slack, each ties his two bands, when the press is lowered, and the truck, with the bale, passed to the front over the platen, and another takes its place.

Having described my invention, what I claim and desire to secure by Letters Patent, is—

The compressing of cotton-bales in trucks, as above described.

RICHARD LEWIS.

Witnesses:
C. VOITG,
W. JACOBS.